A. KRUPP.
Making Spoons, &c.
No. 8,999.
9 Sheets—Sheet 1.
Patented June 8, 1852.
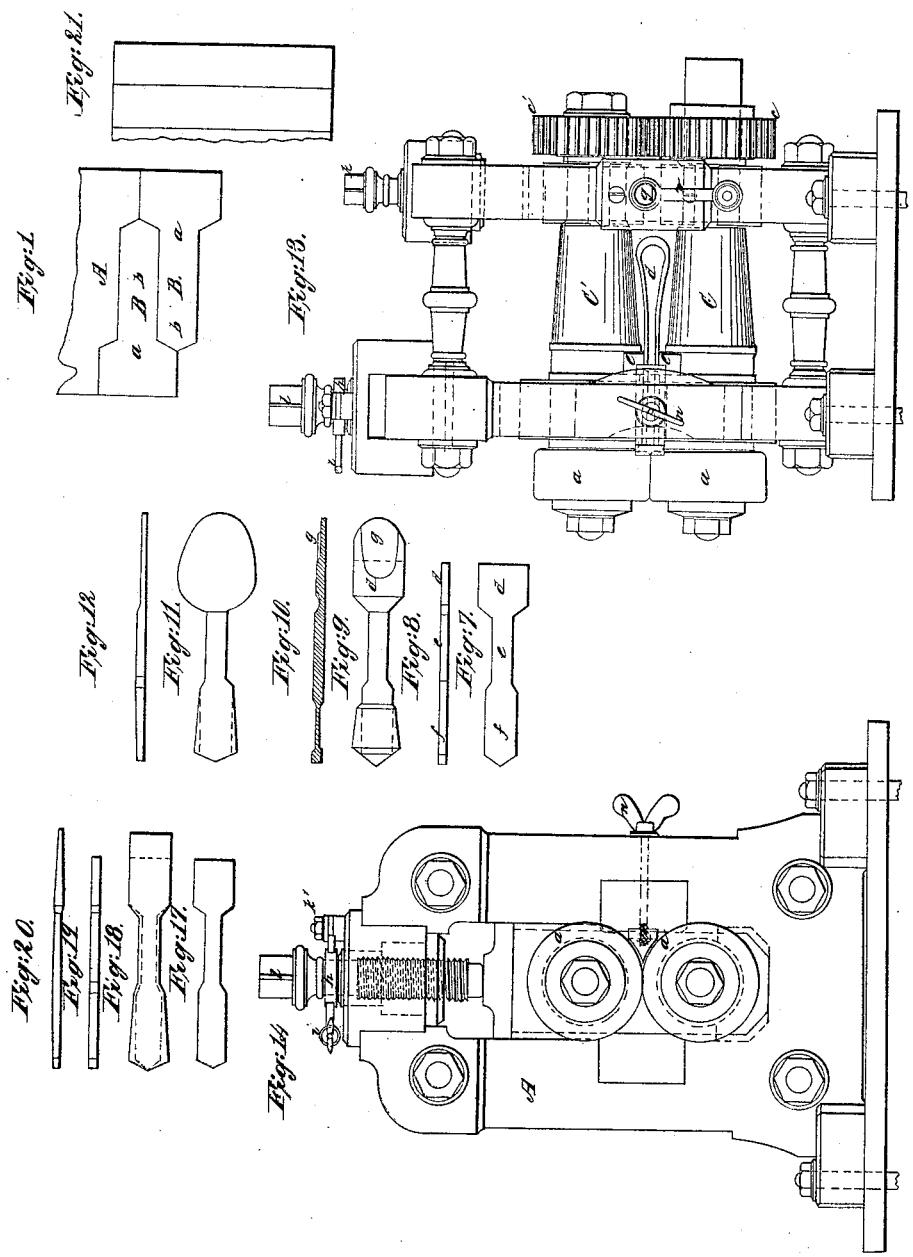

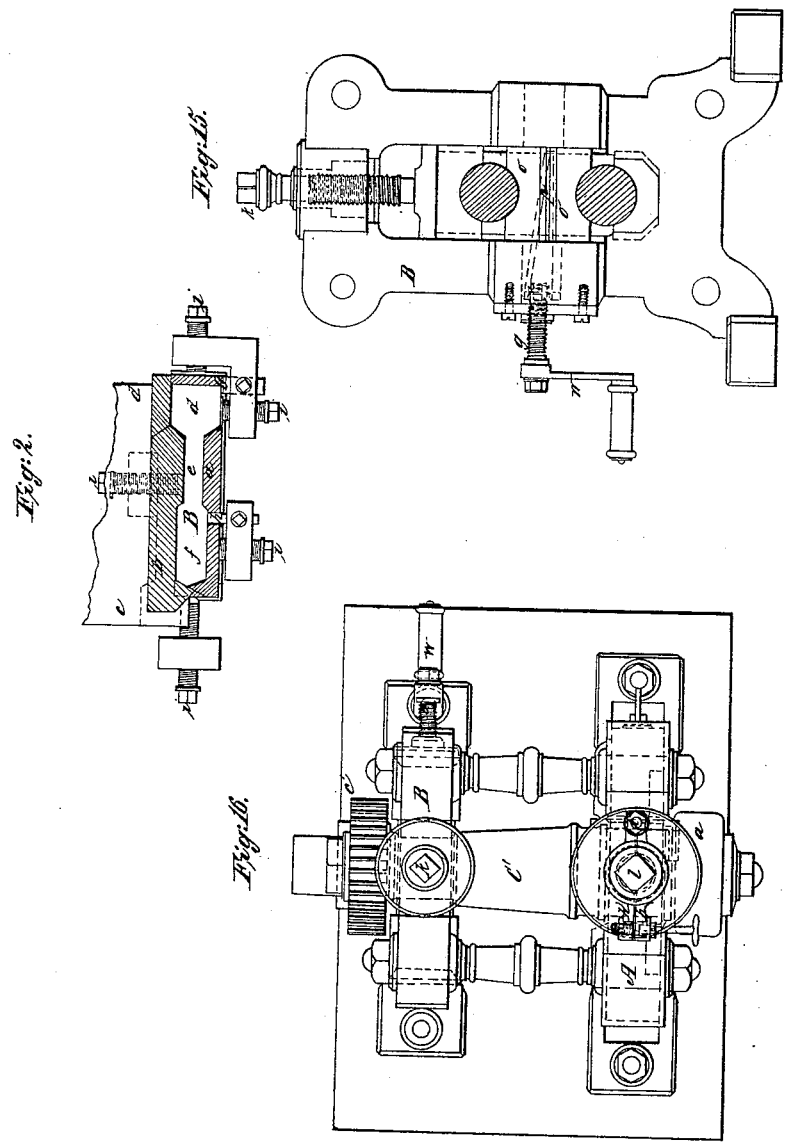

A. KRUPP.
Making Spoons, &c.
No. 8,999.
9 Sheets—Sheet 3.
Patented June 8, 1852.
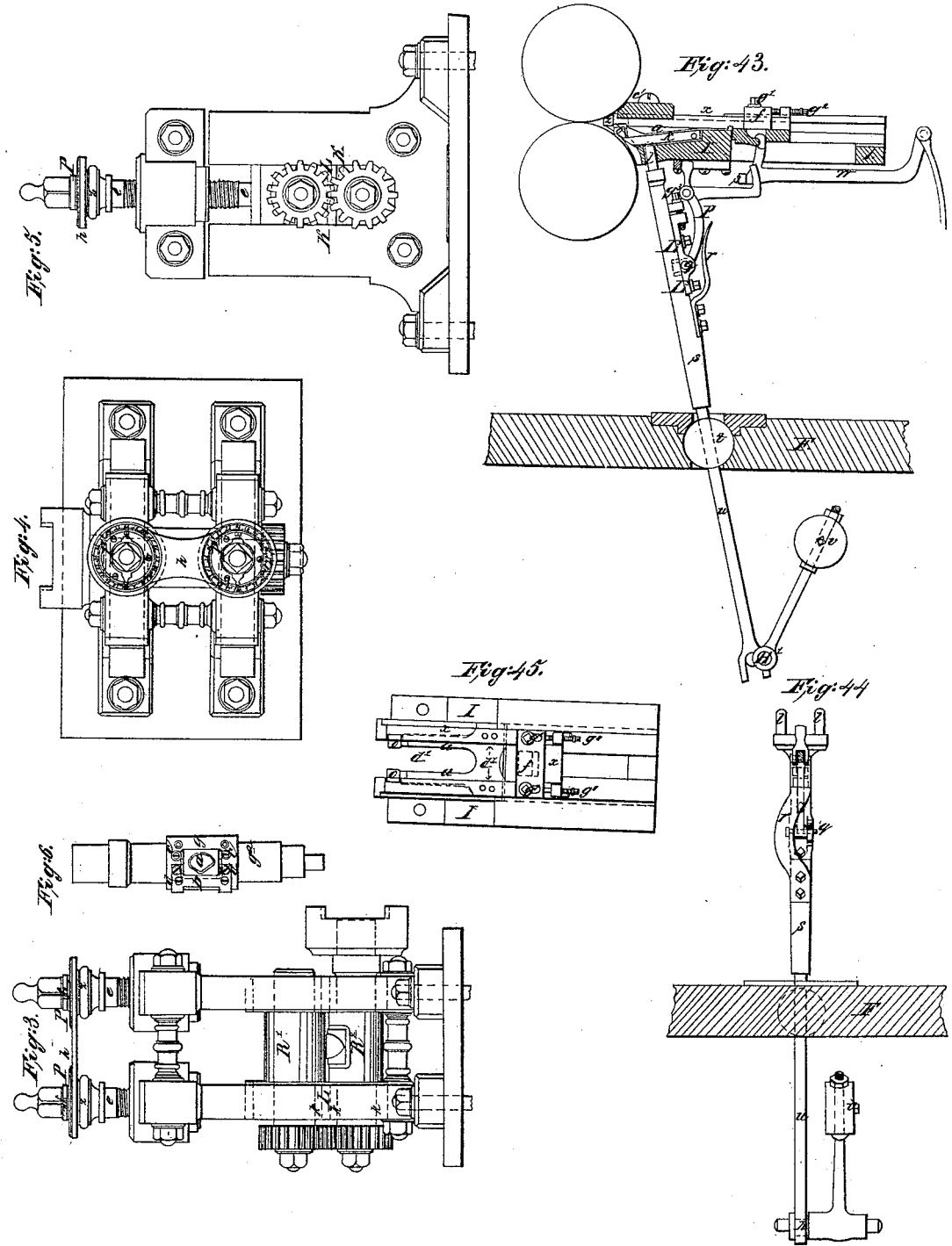

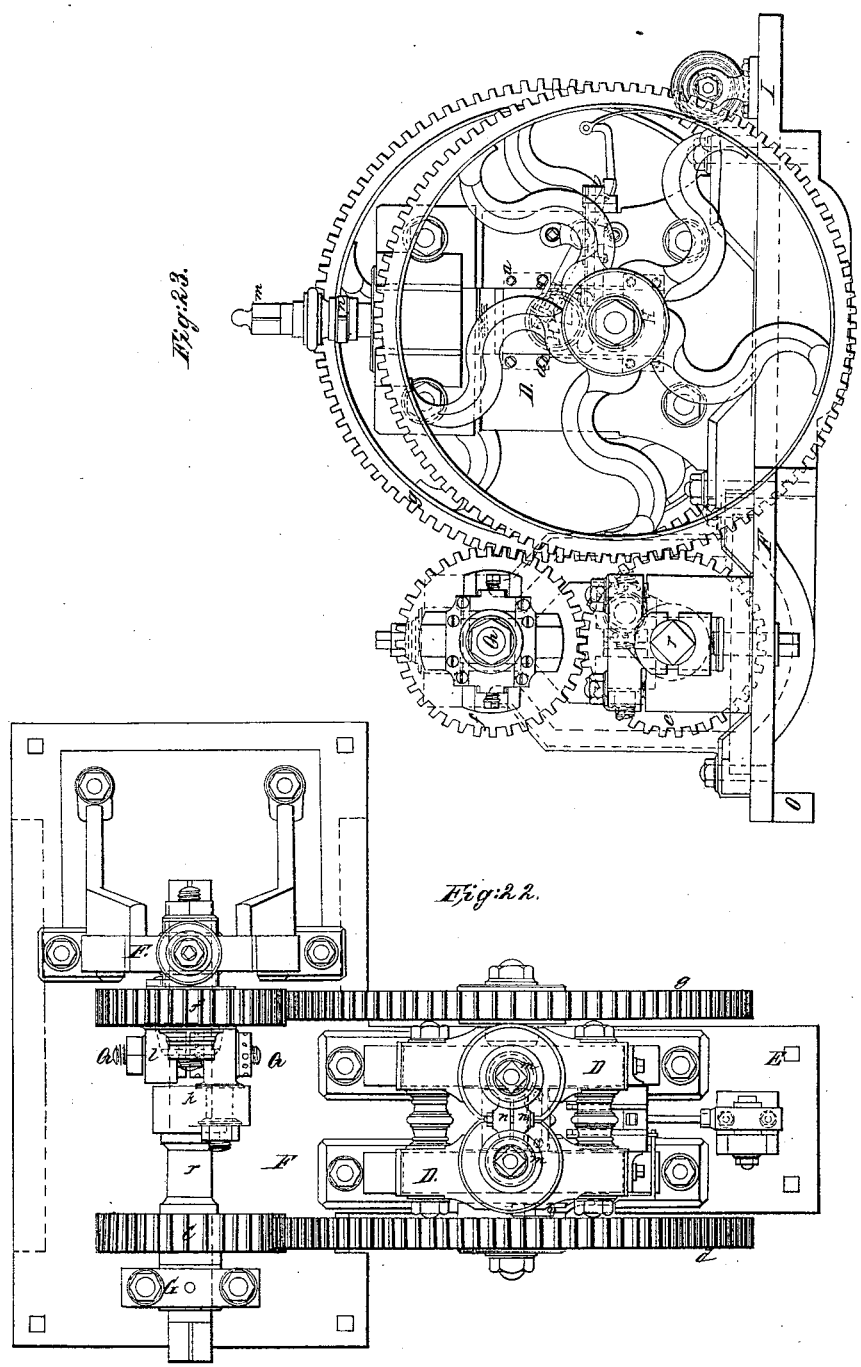

A. KRUPP.
Making Spoons, &c.
No. 8,999.
9 Sheets—Sheet 5.
Patented June 8, 1852.
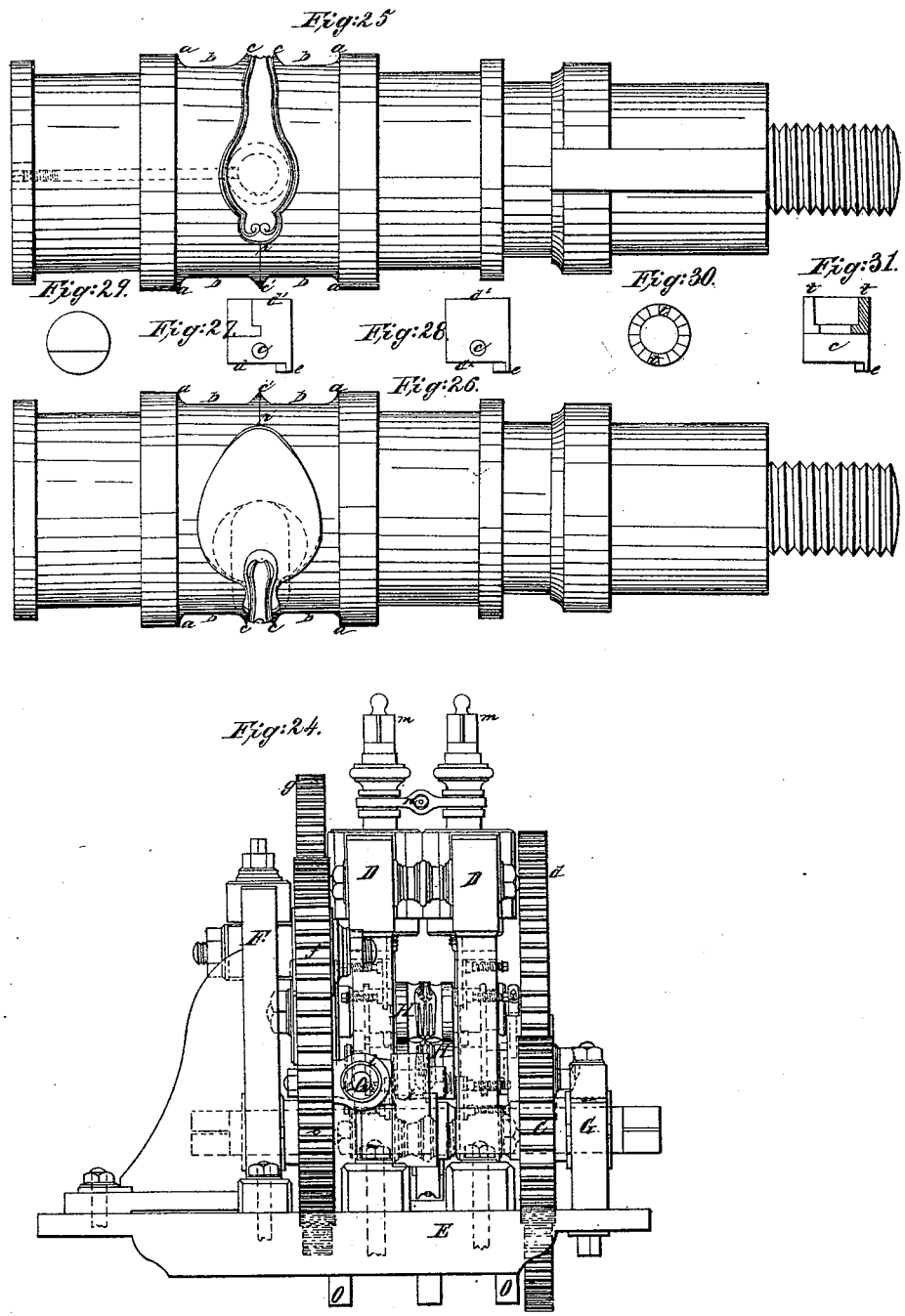

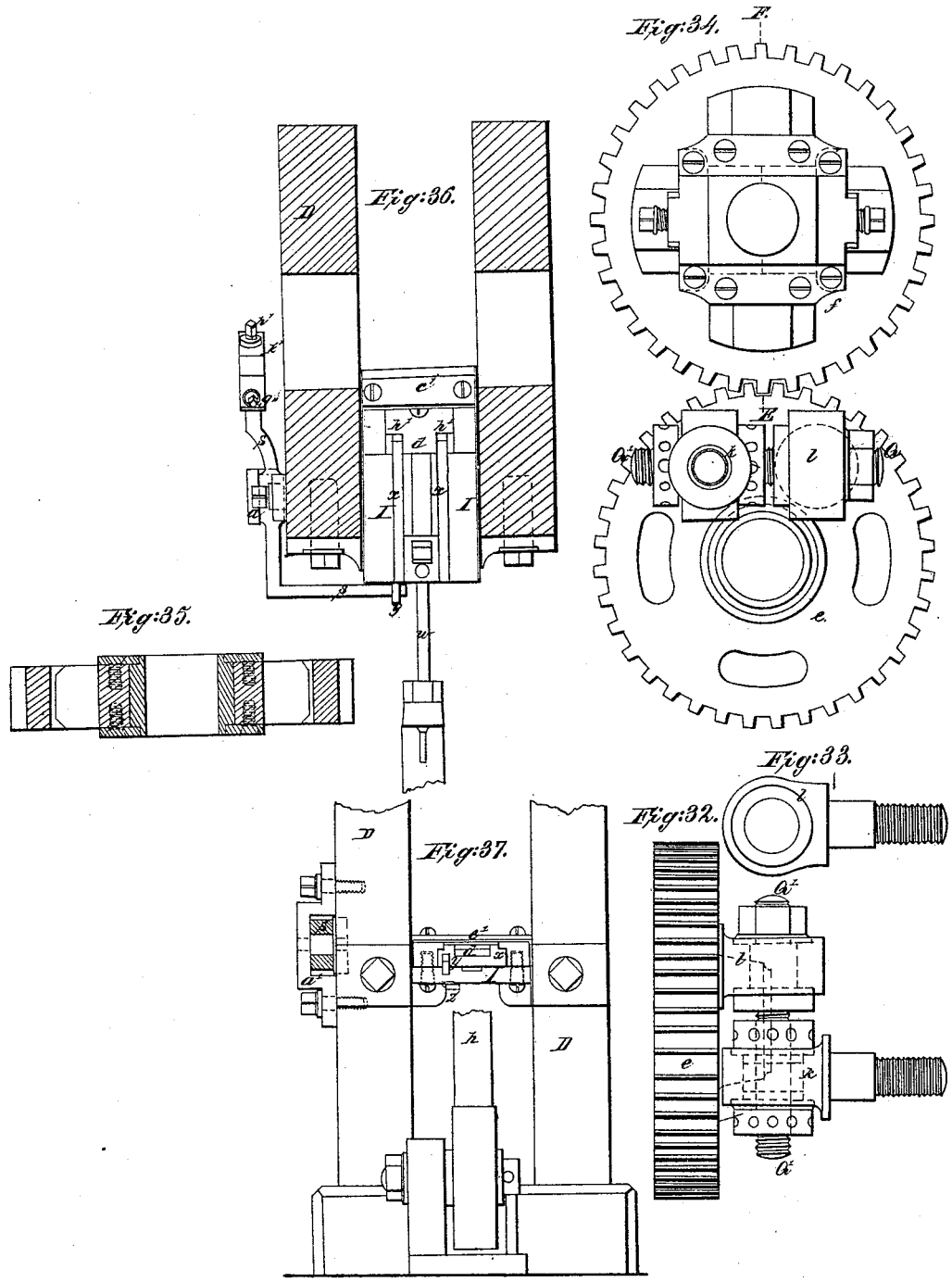

A. KRUPP.
Making Spoons, &c.
No. 8,999.
9 Sheets—Sheet 7.
Patented June 8, 1852.
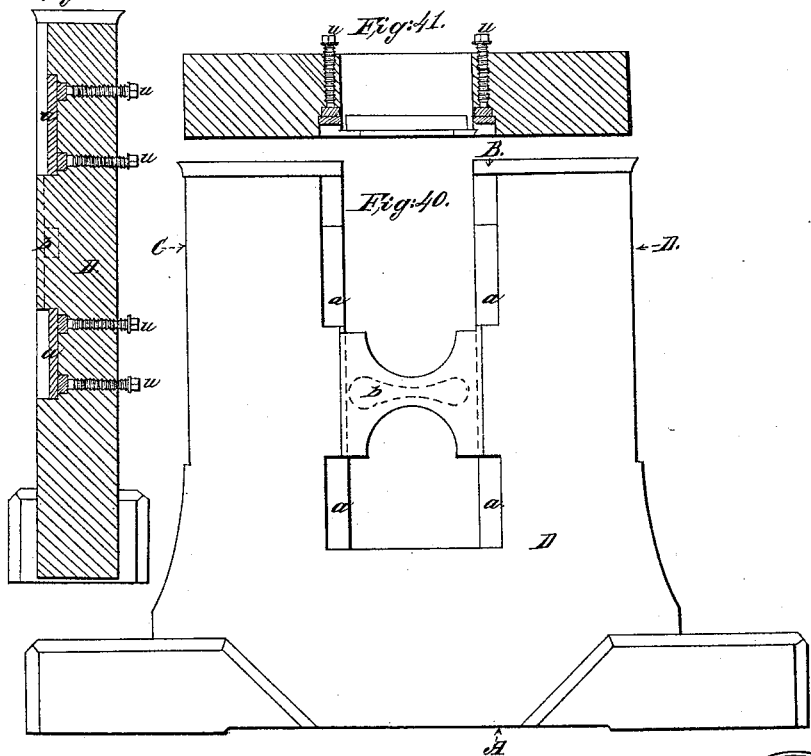

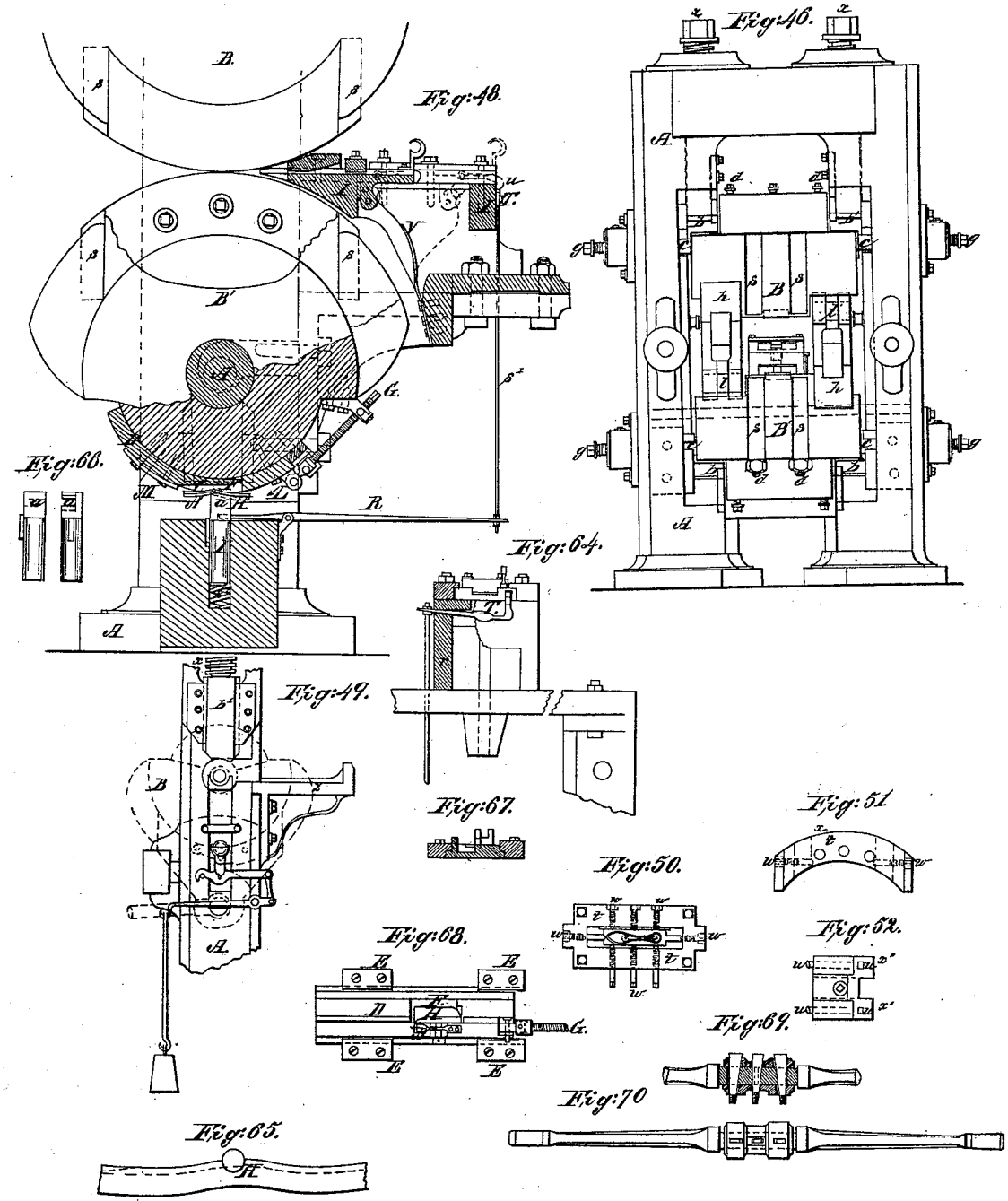

A. KRUPP.
Making Spoons, &c.
No. 8,999.
9 Sheets—Sheet 9.
Patented June 8, 1852.
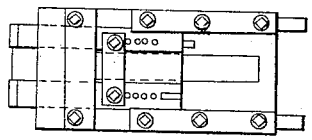
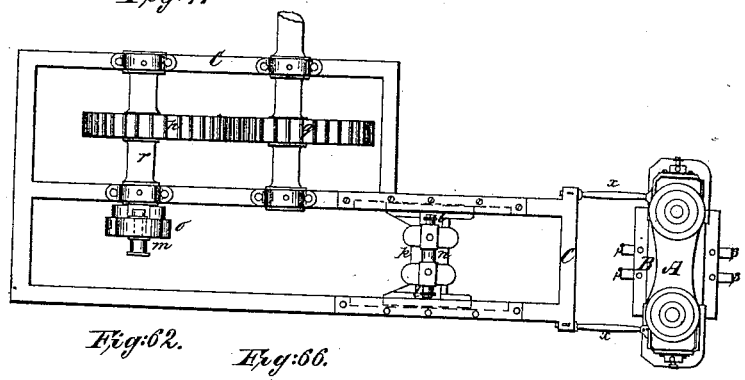
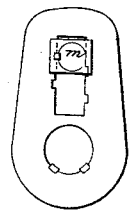
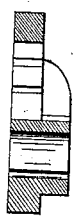
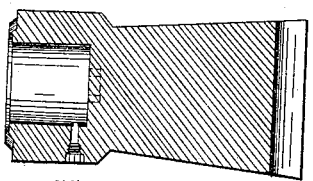
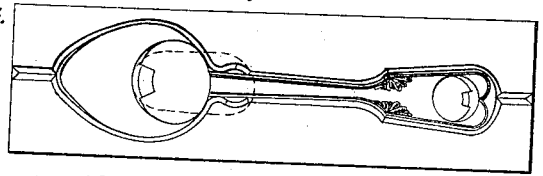

UNITED STATES PATENT OFFICE.

ALFRED KRUPP, OF ESSEN, PRUSSIA, GERMANY, ASSIGNOR TO THOMAS PROSSER.

MACHINERY FOR MAKING SPOONS, FORKS, &c.

Specification of Letters Patent No. 8,999, dated June 8, 1852.

*To all whom it may concern:*

Be it known that I, ALFRED KRUPP, principal of the house of Frederick Krupp, of Essen, in the Kingdom of Prussia, Germany, but now of Leicester Square, in the county of Middlesex, a subject of the King of Prussia, have invented or discovered certain new and useful improvements in the manufacture of spoons, forks, and other similar wares and in the machinery or apparatus employed therein, parts of which are also applicable to other manufacturing processes; and I, the said ALFRED KRUPP, do hereby declare that the nature of the said invention and in what manner the same is to be performed are fully described in and by the present specification thereof, reference being had to the several sheets of drawings hereunto annexed, respectively lettered A, B, C, D, E, and F—that is to say:

I propose first to exemplify in the following description this improved mode of manufacture by showing its application to the manufacture of spoons composed of silver or any other malleable metal or metallic alloy capable of having form or figure given to it by cold pressure alone. The sheets of the metal employed are first cut into strips of a breadth equal to the length intended to be given to the rough blanks and to the length of the bowl part of one blank additional and these strips are then cut into rough blanks out of which the spoons are formed.

When the spoon is of a plain pattern the blank need not be of much greater thickness than the spoon itself is intended to be in its thickest parts, but when the pattern is of an ornamental character the blank should be from one twelfth to one thirtieth of an inch greater thickness than the thickest part of the spoon according to the height of the raised parts and the sharpness desired to be given them. Where the metal is of such a quality that any clippings or filings or other waste can be cheaply remelted and rolled again into plates the blanks may be of such simple straight line forms as are represented in Figure 1 of the annexed drawings. A is the strip of metal, B, B the blanks cut out of it. The part $a$ which forms afterward the bowl of the spoon is a very little broader in the blank than in the finished article (before bending or bowling) and exactly double the breadth of the handle part $b$ so that by alternately reversing the portion of the two parts as shown in the drawing the entire strip of metal may be cut into such blanks without leaving any residue except perhaps at the ends. But when it is of importance to have as little waste as possible I give to the blank a form approaching more nearly to the general contour of the article to be manufactured from it as represented in Figs. 7 and 8 and also by the part B of Fig. 2. In all these figures $d$, $e$ and $f$ represent respectively the parts convertible into the bowl the shank and handle of the spoon. The bowl part ($d$) is in this case from one half to one quarter less in breadth in the blank than in the finished article (before bending or bowling) and of twice the average breadth of the shank and handle parts $e$ and $f$ and by alternately reversing as before the positions of the parts the entire strip of metal may in this case also be cut into a number of such blanks without leaving any residue except it may be at the ends. The cutting machine may be of any ordinary construction.

In the portion of this machine shown in Fig. 2 $a$ represents the under cutter and $b$ the upper cutter—$i$, $i$ are the screws by which the under cutter is secured in its place—$g$, $h$ guides for preserving uniformity in the blanks, and $c$, $d$ the piece of metal out of which the blanks B are cut. The flat blanks so formed are next passed through a rolling machine such as represented in Fig. 3 (a front elevation) Fig. 4 (a plan) and Fig. 5 (an end elevation) in order that the same may be thinned and stretched or elongated in the bowl part. This machine differs from other metal rolling machines in this only that the thinning and elongation are produced by the pressure of the rollers on a die inserted in one of the rollers which die may be exchanged from time to time for other dies.

Fig. 6 is a plan of a roller detached from the machine with a die of the above description let into it—$g$ is the roller—$g^a$ the axis, $a$ the die, and $c$, $c$ the screws by which it is held fast—$b$ is a guide plate secured to the top of the die by the screws $d$, $d$ between and within the projecting edges of which plate the blanks are passed onward to the die.

Supposing the blank to be of the form Figs. 7 and 8 when it has passed through this machine the bowl part $d$ becomes elongated into the form represented in plan Fig. 9 and in section Fig. 10 by the thinning of the portion $g$ to the extent shown in the sectional view Fig. 10.

In order that the point where the die exerts the greatest pressure on the bowl part of the blank may be varied according to the requirements of different patterns, the guide plate $b$ has several holes in it in a line with the screws $d$, $d$ so that it may be fixed nearer to or farther from the die according to circumstances. The same effect may be obtained by employing a number of guide plates of different sizes. The distance between the two rollers ($R'$, $R^2$), is regulated by screws $e$, $e$ after the manner usual in rolling mills; and the distance so determined from time to time is registered on two dial plates P, P by means of two pointers $f$, $f$ which are attached to the ends of the screws and turn with them. The dial plates are connected by a cross plate $h$ which is supported on bearings $z$, $z$ formed on the ends or heads of the screws.

In the space L (Figs. 3 and 5) between the bearings K, K of the rollers $R'$, $R^2$ there is inserted a spring of strength sufficient to keep the top roller ($R'$) tight against the lower ends of the screws. The blank after having been thus elongated is next passed through a cross rolling machine of the construction represented in Figs. 13 (side elevation) 14 (front elevation) 15 (back elevation) and 16 (a plan) in order to widen it in the bowl and handle parts ($d$, $f$) and to bring it there nearly to the general form and figure which it is ultimately to bear. A, B is a strong framework of iron which carries two axles of a conical form C, C'.—C which is the driving axle has attached to it at one end a pinion $c$ which works into and moves a similar pinion $c'$ on the end of the axle C'. On the opposite or larger ends of the axles there are fixed two hoops $a$, $a$ of hardened steel. The axles are kept tight in their places partly by means of a double bent spring $d$ which presses against the bearings $e$, $e$, partly by a wedge key $p$ (see Fig. 15) which is forced between the bearings $o$, $o$ by means of a screw $g$ turned by a winch $w$ and partly by a vertical screw $k$. The distance between the hoops $a$, $a$ is varied at pleasure by means of a vertical screw $l$ which during the working of the machine is kept steady by two arms or half collars $h$, $h$ which are centered on a pin $k'$ and when brought around the neck of the screw are made fast by a screw pin $i$, passed crosswise through their two ends.

The mode in which the blank is pressed out at the two ends to the requisite breadth, and by which its boundary lines are made either parallel oblique or curved consists in changing the hoops $a$, $a$ as for example from those of the form of perfect cylinders to that of cones more or less acute or making them broader or narrower and also by varying the inclination of the axles one toward the other which is readily effected by easing or tightening more or less the bearings of the axles. A blank for example which has been elongated at the bowl end into the form shown in Fig. 9 when passed through this cross rolling machine would assume in the bowl part the shape represented in plan and section in Figs. 11 and 12 and in the handle part either the form shown in Fig. 9 or that shown in Figs. 11 and 12 or any other required form. The blank is introduced by hand between the hoops $a$, $a$ and conducted crosswise between them, the bowl end being passed through first and then the handle end or vice versa.

$m$ Fig. 14 is a wedge shaped guide or stop against which the blank abuts as it passes through and which is pushed as required more or less forward between the hoops by the screw $n$. The blank is next subjected to the action of engraved or otherwise figured rollers of the peculiar construction represented in Figs. 25 and 26 in order to have the ornamental parts cut out, such as the fillets along the edges, or shield or other ornament at the top of the handle. Each pattern is produced by two corresponding matrices one engraved on the upper roller and the other on the under.

Fig. 25 shows one of a pair of rollers with a matrix for the handle engraved upon it and Fig. 26 the reverse side of the roller with the matrix of the bowl part. The diameter of each roller is reduced as shown at the part where the pattern is engraved upon it, that is from $a$ to $a$, and the outer lines of each figure or pattern consist of cutting edges (as $c$, $c$) which while the pattern or figure is in the act of being impressed on the blank, cut away simultaneously the superfluous metal all around, which falls through the vacant spaces $b$, $b$ left between the cutting edges $c$, $c$ and the projecting parts $a$, $a$ of the rollers.

The cutting edges do not project quite so far as the parts $a$, $a$ so that they are protected by the latter from coming in contact. It is by the employment of these cutters and the space allowed for the instant escape of the waste cut away by them that these rollers are particularly distinguished from and superior to all others hitherto employed in this or similar branches of manufacture. When a blank is passed between two engraved rollers of one diameter without any such provision being made for the simultaneous separation of the superfluous or waste metal the impression is liable to be more or less distorted in consequence of the waste metal having a tendency to twist the blank out of a straight line, and the more so as there may happen to be more waste on the one side than the other. But by causing the rollers to impress the pattern and cut away the waste metal at one and the same time all such distortion is prevented a high degree of uniformity is obtained in the shape and thickness of any number of repeats of the same articles and the rollers are worked with not only less labor but with much less tear and wear. As the cutting edges which encircle a pattern necessarily terminate at each end in one common point as $p$ in Fig. 25 or $p'$ in Fig. 26 a single cutting edge $c'$ raised on the periphery of the roller is carried forward from each end of the pattern around to the other end so that any waste which there may be at the ends of the pattern may be also cut through and thrown aside. When any distinctive devices are required to be added to the spoon as a crest or initials I prefer having these engraved either in relief or intaglio on separate dies and letting the dies into recesses made for the purpose in the center of the shield or other outline ornament of the spoon as represented by the circular dotted lines in Fig. 25. The die may be either in one piece or in two or more pieces. Or one die may be inserted within another die.

Fig. 28 represents a die of one piece and Fig. 27 one of two pieces. $d'\ d'$ are the top surfaces and $d^2\ d^2$ the bottom surfaces, $e\ e$ are projecting studs which take into sockets made for them in the bottom of the recesses that contain the dies, and $c, c$ are holes into which a binding screw rod passed lengthwise through the roller (see Fig. 25) is inserted.

Fig. 29 is a top plan of a circular die in two parts. One die may also be inserted within another or within two or three dies.

Fig. 30 (a plan) and Fig. 31 (a sectional elevation) show how a circular die of one piece may be surrounded with a circle of types having letters and figures or other devices on their surfaces; $t\ t$ are the types and $c$ and $b$ the bottom stud and hole for the binding screw rod both as before.

Instead of the cutting edges ($c$ and $c'$) (Figs. 25 and 26) penetrating quite through the metals they may be made to indent them only to such an extent as to prevent the outer or waste parts from acting in the prejudicial manner before described on the article rolled and the waste parts may be afterward readily detached by means of nippers. The blanks are next passed through a forming and cutting machine of the construction represented in Fig. 22 (a plan). Fig. 23 (a side view) and Fig. 24 (an end view). D, D is a framework which is firmly bolted together and rests on a bed plate E supported by cross ribs O, O. H, H is a pair of rollers mounted in the frame work D on which is engraved in duplicate parts the pattern of a fork or spoon (as shown in Figs. 25 and 26 before described). F is a continuation of the bed plate on which are raised the standards G and F′, which carry the ends of the axles Q and $r$.

A pinion C which is affixed to the end of the axle $r$ gears into a wheel $d$ on one end of the axis of the undermost of the two rollers H while another pinion $f$ which revolves on one end of the axle Q and is worked by the other pinion $e$ takes into and actuates the wheel $g$ attached to one end of the uppermost of the rollers H. A crank $k$ (Fig. 22) is keyed on the axle $r$ and connected to the pinion $e$ by a screw pin Q′, which is passed through the head of it and through a piece $l$ screwed into the face of the pinion. The pinion $e$ is simply fitted on to the axle $r$ (not keyed) and is kept steady by means of the screw pin Q′. As by means of this screw pin Q′ the distance between $k$ and $l$ can be increased or diminished at pleasure a perfect correspondence can be thus at all times established between the engraved portions of the two rollers in the longitudinal direction around their peripheries. The degree of pressure to be given to the rollers is regulated by the screws $m, m$ and a coupling piece $n$ which connects these screws and keeps them from shifting Fig. 23.

$u, u, u,$ are a series of screws which regulate the position of the rollers H H from the side as shown more clearly in the detached views of this apparatus given in Figs. 22, 23, and 24 and 40, 41, and 42. These screws are pressed up against a piece of iron or steel $a$ which is in contact with the interior sides of the flanges of the bearings of the rollers. $b$ is a piece of iron or steel which is inserted to prevent the waste or refuse produced by the operation of the machine from falling on the shafts of the apparatus. The two engraved portions of the rollers are kept in perfect correspondence with one another by means of the intergearing of the pinions $e, f$ and the regulating screw pin Q′, and the crank $k$ as shown on an enlarged scale in Figs. 32, 33, 34 and 35.

To insure the passing of the blanks in a uniformly straight direction between the engraving rollers Figs. 25 and 26 I employ a guiding machine of the construction represented in Fig. 22 and more in detail in Fig. 36 (a plan) Fig. 37 (a sectional elevation) Fig. 38 (a side view) and Fig. 39 (a cross section). D, D is a framework which is represented in part only in order to exhibit more clearly the other and more material portions of the apparatus. $x$ is a sliding piece which in its inner breadth must always be equal to that of the handle part of the blank intended to be rolled and can be replaced at pleasure by other slides of greater or less breadth, $h$ is a strong coiled spring which is attached by a connecting rod $w$ to the hinder part of the slide and which when set free forces, the slide forward toward the rollers; $y$ is a hinged catch which when down prevents the slide from being acted upon by the spring. In the drawings this spring is represented as drawn back and ready for operation. The blank is passed under the cover C', with the bowl end foremost and pushed forward till the handle part rests in the open space $d$, $d$ and the bowl part abuts against the projecting edges $h'$, $h'$. A bent lever $s$ is centered in a bearing $a'$, formed on one side of the apparatus; one end ($k'$) of this lever is weighted and rests on the top of the greatest diameter of a cam which encircles the periphery of the box of the driving wheel (which is supposed as in the case of Fig. 38 to be the under wheel) and the other end (or tail) rests on a spring $z$ screwed to the back part I of the frame slide. Supposing a line to be drawn through the resting front of the end $k'$, of the lever $s$ it will be slightly in advance of another perpendicular line drawn through the commencing parts of the engraved portions of the rollers so that as often as these engraved portions begin to come opposite to one another, the larger diameter of the cam is carried by the corresponding revolution of the box of the driving wheel, from under the weighted end $k'$, of the lever which falling down on the lower diameter tilts up the small end (assisted by the spring $z$) which striking against the catch $y$ raises it up and liberates the slide $x$ on which the spring $h$ drives it forward (with the blank upon it) toward the rollers. The slide is prevented from moving too far forward by means of a stud $l$ on the under side of it which catches against a stop $m'$. The block by which the end $k'$, of the lever $s$ is weighted is made to slide upon the lever and may be fixed at any distance from the extremity which may be required by the position of the terminating points of the engraved patterns by means of the regulating screws $p'$, $p'$, and $g''$. After the blank has passed from the slide between the rollers the slide is withdrawn by application of the hand to the ring $n$ in order to be ready for a repetition of the preceding operation.

A modification of the conducting apparatus last described is represented in Fig. 43 (sectional elevation) Fig. 44 (end view) and Fig. 45 (plan). There is a slide $x$ actuated by a spiral spring $h$ a cover $c'$, which secures the blank to the slide and a lever which sets the spring $h$ free to act at the proper moment on the slide all as before; but there are several alterations in the subordinate details having for their object to give the apparatus a command over the smallest parts of the blank equally with the largest. $k$ is one of two bars which are movable on a cross pin and free to rise and fall within a recess cut out of the framework I. The free ends of these bars rest on the top $l$ of a bar $s$ which passes by a prolongation $u$ through the part of the framework F and terminates at the bottom in a crutch which rests on a crank pin H', $t$ is a ball or sort of universal joint through which the prolongation $u$ is passed in order to keep it always in its proper position. $v$ is a counterpoise to the bar $s$ which is attached to the crank pin H', $x$ is the sliding piece in which the blanks are laid, $a$ is a spring which instead of being of an equal thickness as before is increased in thickness toward the side on which the blanks are placed and terminates in two prominent cheek pieces $o$, $o$. The blank is passed with the bowl end foremost under the cover $c'$, and pushed forward till the top abuts against the cross piece $f$ which is secured to the slide by the screws $g'$, $g^2$, by which operation the broadest part of the handle is gripped between the sides $d'$, of the bed plate, and the narrowest between the cheek pieces O, O, while the bowl part remains wholly outside of the slide and next to the rollers. When in the forward progress of the blank between the rollers, the broad end of the handle comes in contact with the cheeks O, O, being prevented by the cover C' from inclining upward, it presses of necessity these cheeks down and with them the bars $k$ and $s$, raising the counterpoise $v$ from a horizontal position to the degree of perpendicularity shown in the drawing. The bar $s$ is kept in this depressed position while the broad end of the blank is gliding over the cheeks O, O by means of a curved lever P hinged to the back of the bar $s$ the upper end of which is brought by the depression of the lever under the part I of the framework and the lower end upheld by a strong spring $r$ also bolted to the back of the bar $s$. After the blank has passed quite free of the feeding apparatus at the point $z$ the slide is drawn back by the application of the hand to a ring as before. And as the connecting rod $w$ recedes it draws with it a cross bar $s'$, which pulls back the curved lever P from under the part I of the framework and allows the lever $s$ to be thrown up again by the counterpoise into its original position. In all cases except when the lever $s$ is forcibly depresed as has been just explained it serves to keep the cheeks O, O firmly pressed upward against the cover C' so that however narrow any part of the blank may be it must be conducted with unerring exactness between the rollers. An increase in the thickness of the blanks will make it necessary to increase the distance of the pin $q$ on which the curved lever P is centered from the part I of the framework and this may be effected by means of the adjusting screws $g^3$ and $L^3$. The screws $g'$ and $g''$ are employed to steady the apparatus and prevent it from being shaken by the action of the spring $h$ or counterpoise $v$.

Having now exemplified the nature of my invention in its application to the manufacture of spoons I now proceed to point out in what respects the preceding operations are respectively modified when applied to forks composed also like the spoons of some metal or metallic alloy capable of having form or figure given to it by cold pressure alone. The rough blanks are in this case cut in parallel lines as represented in Fig. 21 and of a little greater width than the article in its finished state or of the more exact form represented in Figs. 17 and 19. The average breadth of the handle part in such blanks as Figs. 17 and 19 must be half that of the largest or prong part and is consequently in general smaller than the same part in the blanks for the spoons which the finished fork is to match, but it must then be at the same time thicker as it has to be afterward pressed out by cross rolling throughout its entire length to the extent indicated by space between the cross and full lines in Fig. 18 and by the edge view Fig. 20. The blanks (whether of the form Fig. 21 or Fig. 17) are as in case of the spoons first passed through the elongating machine (Figs. 3, 4 and 5) which imparts to them the shape represented in Figs. 18 and 20 and then through the forming and cutting machine Figs. 22, 23 and 24. A guiding machine is used in the same way as in the case of spoons to lead the fork blanks to the rollers either of the construction represented in Figs. 22, 36, 37, 38 and 39 or of that represented in Figs. 43, 44 and 45 with this difference only that a piece of iron is secured to and regulated by a screw in the hole $f$.

In the same way in which spoons and forks are thus manufactured a great many similar wares may be produced as sugar and asparagus tongs, fruit knives, some sorts of scissor blades, snuffer pieces, etc., or at least with such obvious modifications only as will readily suggest themselves to any competent workman.

I have assumed in the preceding descriptions that the metal or metallic alloy employed is of such a quality as to be capable of receiving any form or figure by cold pressure alone but the whole of the machinery and processes described will be found equally applicable whether the metal is used in a warm or cold state taking care only to employ a quicker motion when the metal is warm, spoons, forks and other like wares may be produced in the same perfection by means of my invention (with the exception as before explained of the filing, bowling and finishing processes in iron and steel when duly heated for the purpose) as in the more ductile metals of silver and gold. I have hereinbefore directed the rough blanks to be first elongated and then widened, but in certain cases, as for instance, where the finished bowl of a spoon is required to be of different thicknesses in the breadth the cross rolling may be executed first and the operation of elongation afterward performed by means of a die with a curved surface let into one of the rollers as before described.

The power required to work the rollers will depend partly on the size of the articles to be manufactured partly on the quality of the metal employed partly on the degree of pressure necessary to produce the given pattern and partly on the rapidity with which the articles are required to be produced. In general steam power will be the most suitable but where the articles are small and quick work is not desired hand power will suffice. The rollers and also the dies inserted or used in combination with such rollers should be of a good quality of steel and hardened in the same way as rollers and dies used in coining. Instead of a rotary motion being given to the rollers a semi-rotary or oscillating motion may occasionally be preferable as for example in the use of short articles or figures where the rollers have but to make a short longitudinal traversal.

Instead of using rollers at all as in the machine before described the same effects may be accomplished by means of flat oscillating blocks in the manner represented in Fig. 46 (a back elevation) Fig. 47 (a plan) and Figs. 48 and 49 (sectional elevations). A, A, is the framework of a machine constructed on this reciprocating or oscillating principle, B, B′, are two semicircular blocks which oscillate on axes A′ sustained by bearings $b$, $b$, the ends of the axes A′ have recesses cut in them in which rest the ends of two smaller axes $c$, $c$, which by means of the screws $g$, $g$, regulate laterally the position of the blocks B, B′. A sliding piece $k$ which moves on the face of an additional framework $c$, $c$, $c$, Fig. 47 is connected with the framework A by links $x$, $x$, and two levers $h$, $h'$, Fig. 46 are attached to the blocks B, B′ and connected by pins $i'$, $i'$ Fig. 46 to the ends of two rods (the form of one of which is shown separately in Figs. 69 and 70), which rods again are connected by their opposite ends to the sliding piece $k$ at the points $l$, $l$ while a third rod which passes from the center $n$ of the sliding piece $k$ connects it to the pin $m$ of a crank $o$ of which a front view and section are given separately in Figs. 62 and 66. Motion is given to the crank $o$ by means of the shaft $r$ and two eccentric toothed wheels $p$, $q$ which have this eccentricity given to them in order that the blocks when pulled forward may move with comparative slowness and move quickly on their return.

The pattern required to be given to the spoons, forks or other articles is engraved in duplicate on dies and surrounded with cutting edges in the same way as in the case of the rollers before described or where the article is without any ornament the dies present the cutting edges necessary to give it its intended shape. These dies are set in frames $t$ a plan and elevation of one of which are given separately at Figs. 50, 51 and 52 and these frames are secured to the surface $v$ of the blocks by inserting them between flanges $s, s$ (Figs. 47 and 48) and kept steady there by means of binding screws $u, u$ which pass in a lateral direction through the blocks. A plan and section of one of these dies are given separately on an enlarged scale in Figs. 55 and 56. The space in the frame $t$ appropriated to the dies is made large enough to admit of dies of various sizes being introduced; they are held fast by screws $w, w$ and their raised circumference $x''$ serves the same office of protecting the cutting edges as the projecting parts $a, a$ of the rollers in Figs. 25 and 26.

The dies may consist of one two or more pieces either combined laterally or inserted one within the other in the same way as before explained in the case of dies let into rollers and as again exemplified in Figs. 57, 58, 59, 60 and 61. According as the dies are longer or shorter a corresponding difference must be made in the length of traverse of the blocks, and this is effected by moving the pin $m$ of the crank farther from or nearer to the axis of the crank. In order to facilitate the substitution of one die for another the upper block has counterweights attached to it on each side of its bearings as shown in Fig. 49 by which it may be raised or lowered. The screw $x\ x'$ having loosened the top bearing of the upper block it is raised till it is on a level with the surface of a pair of brackets Z securely fixed to the framework along which it is slid. Access being thus obtained to the under block the die which has been in use is removed and after it has been replaced by another the top block is restored to its former position when the apparatus is again ready for work. The blanks are supplied to this oscillating machine by a conducting machine constructed on the same principle as both of these before described but differing a little in the details. The relative position of the conducting machine to the oscillating apparatus when in operation is particularly shown in Fig. 48 in which the die frames are represented. Fig. 63 is a plan of the upper part of this conducting apparatus. Fig. 64 an end view of it and Fig. 68 an under plan. D is a frame which is attached by means of flanges and of screws E to the bottom of the block B'. F is a recess cut out in the frame D which is closed more or less by a slide H of which a separate view on an enlarged scale is shown in Fig. 65. I is a vertical bar which moves up and down in an opening made according as it is actuated by a spiral spring $k'$ in which it rests. When the block B' is moved in the direction of the arrow M the blocks are in a position ready to receive a blank. The conducting apparatus is therefore drawn back (by hand) into the position indicated by the dotted lines (Fig. 48) while at the same time the spring N causes the slide H to close one-half of the recess F leaving the other open. On a reverse or forward motion being now given to the block B' that is to say in the direction of the arrow L the spiral spring K' being more powerful than N presses down the slide H and completes the circle allowing the top part of the bar I to glide along it on to the surface of the piece D. But as soon as the pressure of the bar I is removed from off the slide H the spring N again forces down and closes the end M leaving the other end L open so that when the slide H comes up to the bar I it slides into the recess $a$ Figs. 48 and 71 cut on its upper part which allows the bar to rise into the recess F carrying with it the short arm of the lever R and consequently depressing the long arm which through the medium of the wire S' and lever T (Fig. 64) raises the catch $u$ of the sliding piece of the conductor and allows the spring V to act upon it and carry forward the blank between the dies on blocks B B'. The inclined part C' of the recess allows the bar to emerge from it as the block B' advances. The spring N on this immediately causes the slide H to close the whole of the recess and thus again complete the circle of operations. The length or the oscillating motion must slightly exceed the length of the engraved dies in order to allow of sufficient time to draw back the sliding part of the conducting apparatus or to insert another blank. The proper moment for raising the catch $a$ is determined by the screw G and must of course correspond with the commencing parts of the engraved portions of the dies.

What I claim is:

1. The employment for trimming the edges and giving the ornaments to the blanks; of a pair of rollers each of which is furnished with a cutting edge, and a device engraved within the same, and a space outside of said cutters for the reception of the waste, said rollers being so worked and applied to each other, that the cutting edges of the one comes in contact with, and cuts against the cutting edges of the other.

2. I do not claim simply a movable die— but what I do claim is, a movable die, located within the pattern dies, so that, spoons or forks, having various crests names or initials thereon, may be made by the same contour or device, and edge pattern.

ALFRED KRUPP.

Witnesses:
 A. L. SCHNITZLER,
 CARL KRIEGER.